United States Patent [19]

Katayama

[11] 4,330,139
[45] May 18, 1982

[54] SAFETY MEANS FOR AUTOMOBILE STEERING MECHANISMS

[75] Inventor: Kazuo Katayama, Hiroshima, Japan

[73] Assignee: Toyo Kogyo Co., Ltd., Hiroshima, Japan

[21] Appl. No.: 162,442

[22] Filed: Jun. 24, 1980

[30] Foreign Application Priority Data

Jun. 27, 1979 [JP] Japan .............................. 54-89039[U]

[51] Int. Cl.³ .............................................. B62D 1/18
[52] U.S. Cl. ........................................ 280/777; 74/493
[58] Field of Search ............... 280/777, 779, 780, 775; 74/493

[56] References Cited

U.S. PATENT DOCUMENTS 3,373,965  3/1968  Bien et al. .............................. 74/493
3,548,675  12/1970 Crimes et al. .......................... 74/493
3,621,732  11/1971 Kaniut .................................. 280/775

FOREIGN PATENT DOCUMENTS 2054116  7/1972  Fed. Rep. of Germany ...... 280/777
2821707  11/1978 Fed. Rep. of Germany ...... 280/777
50-30750  3/1975  Japan .
1362899  8/1974  United Kingdom ................ 280/777

Primary Examiner—Robert R. Song
Attorney, Agent, or Firm—Fleit & Jacobson

[57] ABSTRACT

An automobile steering mechanism comprising a steering shaft disposed in a steering column which is supported on the automobile body through a steering bracket. A leaf spring is provided between the steering column and the steering bracket for normally forcing the steering column into frictional engagement with the steering bracket. The leaf spring is so arranged that it is disengaged from the steering column so that the steering column becomes axially movable by being released from the frictional engagement with the steering bracket.

8 Claims, 10 Drawing Figures

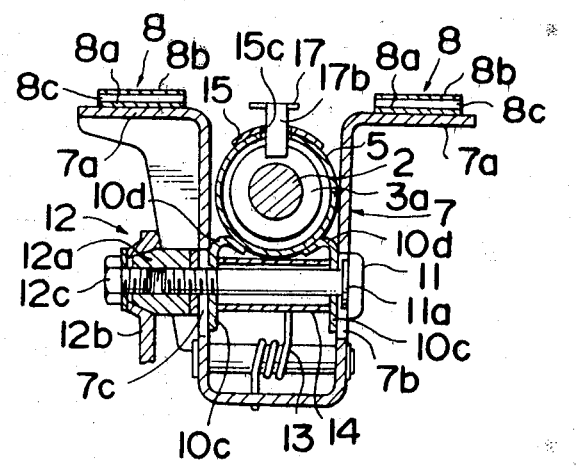
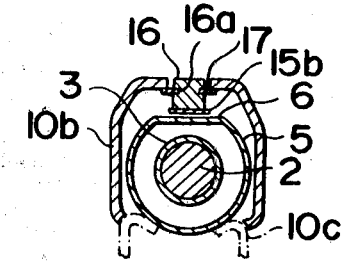
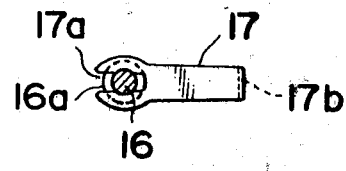
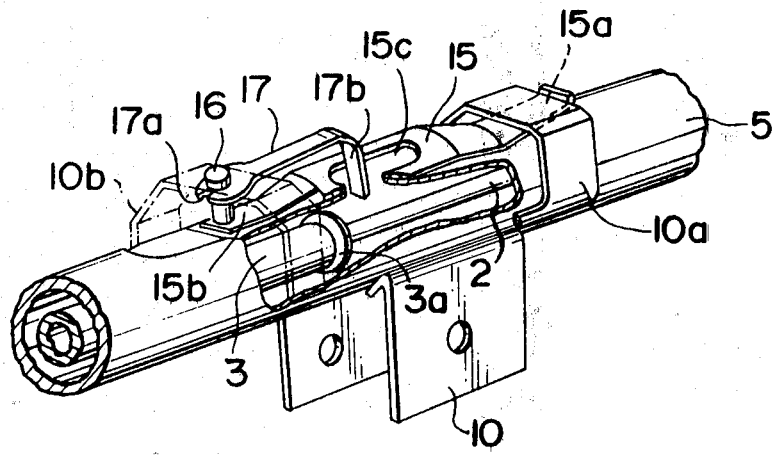

SAFETY MEANS FOR AUTOMOBILE STEERING MECHANISMS

The present invention relates to automobile steering mechanisms, and more particularly, to automobile steering mechanisms provided with safety means which allows forward displacements of steering column assemblies under crash so that drivers are protected from serious damages.

In conventional automobiles, it has often been experienced that drivers are damaged in crash of the automobiles by being hit by steering wheels. This has mostly been caused by the fact that the direction of the relative movement between the driver and the steering wheel which may be produced when the automobile is crashed does not coincide with the direction of the axis of the steering column assembly so that the steering column assembly and its support mechanism cannot absorb crashing energy. In order to solve the above problem, it has been proposed to install the steering column assembly on the automobile body through a support mechanism which is so designed that the steering column assembly is disconnected from the automobile body when the automobile is crashed. For example, in Japanese patent application No. 50-30750 filed on Mar. 14, 1975 and disclosed for public inspection on Sept. 22, 1976 under the disclosure number 51-106924, there is disclosed an automobile steering device in which the steering column is comprised of a pair of telescopically slidable upper and lower tubular members, the lower member being secured to the steering gear casing and the upper tubular member to the steering column bracket by means of a retaining pin which is formed on a swingable lever. The swingable lever is normally biased by a spring to a position wherein the retaining pin connects the upper tubular member to the steering bracket. When the automobile is crashed, a rearward movement which is produced in the lower tubular member causes the swingable lever to move from the aforementioned position against the influence of the biasing spring so that the upper tubular member is released from the steering bracket. Since the steering shaft which is located in the steering column is also comprised of a telescopically slidable upper and lower shaft members, the steering shaft and the steering handle provided thereon as well as the upper tubular member of the steering column can be displaced forwardly when the driver is abutted to the steering handle to thereby eliminate or substantially weaken the damages on the driver.

It should however be noted that the known steering device is not recommendable since there is a possibility that an appreciable play is produced in the connection between the steering column and the steering bracket. Further, a significant force is required to disconnect the steering column from the steering bracket. In the aforementioned Japanese patent application, there have been disclosed two further modifications, however, such modifications are not effective to eliminate the disadvantages described above.

It is therefore an object of the present invention to provide an automobile steering mechanism having reliable safety means for disconnecting the steering column from the automobile body when the automobile is crashed.

Another object of the present invention is to provide safety means for automobile steering mechanisms which does not produce any undesirable play in the steering column mounting mechanism.

A further object of the present invention is to provide safety means for automobile steering mechanisms in which the steering column can be disconnected from the automobile body without fail by a relatively small force when the automobile is crashed.

According to the present invention, the above and other objects can be accomplished by an automobile steering mechanism comprising steering shaft means, steering column means for rotatably supporting said steering shaft means, steering bracket means provided on an automobile body for supporting said steering column means, spring means for urging said steering column means against said steering bracket so that said steering column means is frictionally held on said steering bracket means, releasable constraining means for normally holding the spring means in an operative position wherein said spring means applies its influence on said steering column means so that said steering column means is urged against the steering bracket means, means responsive to a crashing deformation of the automobile body for releasing the constraining means so that the steering column means is relieved of the influence of the spring means to thereby release the steering column means from the bracket means. In one mode of the present invention, the spring means is comprised of a leaf spring extending longitudinally along the steering column means and having one end held between the steering column means and the steering bracket means. The other end of the leaf spring is provided with a pin having a circumferential groove for engagement with a bifurcated end of a retaining clip member which functions, when engaged with the circumferential groove of the pin, to force the other end of the leaf spring against the steering column means to thereby maintain a frictional engagement between the spring and the steering column means. The retaining clip member is so arranged that it is kicked when the automobile is crashed so that the bifurcated end of the clip member is disengaged from the pin on the leaf spring to thereby release the leaf spring from engagement with the steering column means.

The means for kicking the retaining clip member may be in the form of a kicker provided on the steering shaft means at such a portion that is axially displaced upon a crash of the automobile. Alternatively, the kicker may be provided on a knee pad which may be forced forwardly, when the automobile is crashed, by the knee of the driver. Still alternatively, the kicker may be connected with such a member on the automobile body, for example, a brake master cylinder bracket, that will be rearwardly displaced with respect to the steering column means when the automobile is crashed.

According to one aspect of the present invention, the steering bracket means is secured to the automobile body such as a dash panel through deformable means whch can be deformed when the steering column means is axially displaced with respect to the steering bracket means. The deformable means may be in the form of a U-shaped sheet metal member having longitudinally extending upper and lower legs which are respectively secured to the body and the steering bracket means so that the steering bracket means is displaced with respect to the body causing a deformation of the U-shaped member.

The above and other objects and features of the present invention will become apparent from the following descriptions of preferred embodiments taking reference to the accompanying drawings, in which;

FIG. 3 is a sectional view taken substantially along the line A—A in FIG. 2;

FIG. 4 is a sectional view taken substantially along the line B—B in FIG. 2;

FIG. 5 is a view substantially along the line C—C in FIG. 2;

FIG. 6 is a partially cut-away perspective view showing the arrangement of the frictional retaining spring member;

Figure 1:
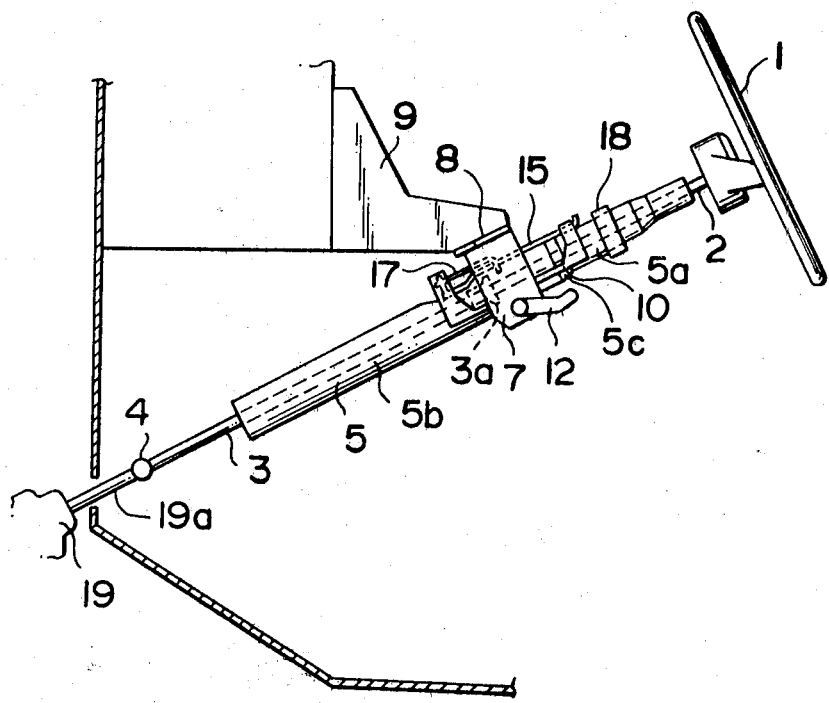
FIG. 1 is a side view of an automobile steering mechanism in accordance with one embodiment of the present invention.

Referring to the drawings, particularly to FIGS. 1 through 6, there is shown a steering mechanism including a steering wheel 1 mounted on one end of an upper steering shaft 2 which is connected with a lower steering shaft 3 so that they rotate together but are axially slidable with each other. The lower steering shaft 3 is connected at the lower end with an input shaft 19a of a steering gear box 19 by means of a universal joint 4. The upper and lower steering shafts 2 and 3 are disposed in a substantially tubular steering column 5 which has an upper portion 5a of a reduced diameter which is continuous with a lower large diameter portion 5b through a shoulder portion 5c. Adjacent to the shoulder portion 5c, the large diameter portion 5b of the steering column 5 is formed at the upper surface thereof with a flat portion 6 which is followed at the end opposite to the shoulder portion 5c by a recess 5d.

The steering column 5 is supported by a steering bracket 7 of a substantially U-shaped cross-sectional configuration having a pair of legs which are formed at the upper ends thereof with outwardly bent flanges 7a. The steering bracket 7 is secured at the flange 7a to a mounting bracket 9 respectively through deformable members 8. The mounting bracket 9 is secured to a portion of the automobile body such as a dash panel or an instrument panel. Each of the deformable members 8 is of a substantially U-shaped cross-sectional configuration having a lower or shorter leg 8a and an upper or longer leg 8b which are contiguous with each other through a junction 8c. The member 8 is disposed with the junction 8c located at the forwardmost position and connected at the lower leg 8a with the respective one of the flanges 7a of the steering bracket 7 by means of welding and at the upper leg 8b with the mounting bracket 9 by means of a bolt 9a. Thus, the members 8 are deformable at the junctions 8c to allow a forward displacement of the steering bracket 7 with respect to the mounting bracket 9.

Figure 2:
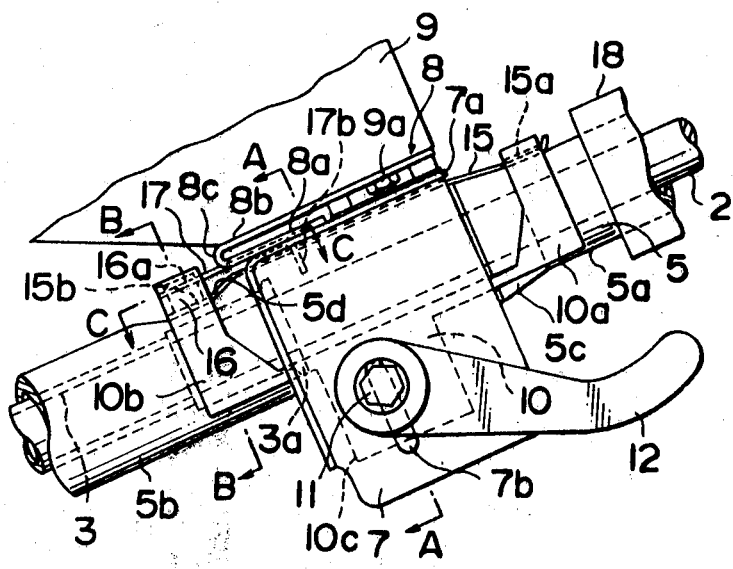
FIG. 2 is a fragmentary side view showing the releasable connection between the steering column and the steering bracket.

As shown in FIG. 3, there is provided in the steering bracket 7 a holding bracket 10 which includes, as shown in FIGS. 2 and 6, a rear and front straddling portions 10a and 10b, respectively, and a pair of flat side portions 10c extending at the opposite sides between the portions 10a and 10b. The vertical leg portions of the steering bracket 7 are formed with aligned slots 7b and 7c and a securing bolt 11 is inserted through the slots 7b and 7c in the steering bracket 7 and corresponding bolt holes in the side portions 10c of the holding bracket 10. The bolt 11 is formed at an end adjacent to the head with an elongated land 11a which is adapted to be engaged with the slot 7b so that the bolt 11 is held against rotation. The bolt 11 is threaded at the other end which is engaged with a nut assembly 12 comprising a nut member 12a which is secured to an actuating lever 12b by means of a bolt 12c. The nut assembly 12 can therefore be actuated by the lever 12b to tighten or loosen the bolt 11.

The side portions 10c of the holding bracket 10 are formed at the upper edges thereof with seats 10d for receiving the steering column 5. A spring 13 is provided for urging the bracket 10 upwardly toward the steering column 5. Where desirable, a spacer 14 may be provided between the side portions 10c of the bracket 10. It should be noted that in the illustrated arrangement, the bolt 11 can be loosened by actuating the nut assembly 12 through the lever 12b to thereafter displace the holding bracket 10 along the legs of the steering bracket 7 so that the tilt angle of the steering column 5 can be changed as desired.

The holding bracket 10 is disposed with respect to the steering column 5 in such a manner that the rear straddling portion 10a is positioned on the reduced diameter portion 5a of the steering column 5 and the front straddling portion 10b on the recess 5d. A leaf spring 15 is provided to extend along the flat portion 6 of the steering column 5 and has one end 15a held between the reduced diameter portion 5a of the steering column 5 and the rear straddling portion 10a of the holding bracket 10. The other end 15b of the spring 15 extends to a space between the recess 5d in the steering column 5 and the straddling portion 10b and is provided with an upright pin 16 which is formed with a circumferential groove 16a at the upper end portion thereof. As shown in FIG. 4, the front straddling portion 10b is formed at the upper portion with an opening for allowing the pin 16 to pass therethrough. In order to force the end 15b of the spring 15 toward the recess 5d on the steering column 5, the groove 16a in the pin 16 is engaged with a retaining clip member 17 which has a bifurcated end 17a for engagement with the groove 16a in the pin 16. As shown in FIG. 4, the bifurcated end 17a of the member 17 has a width which is sufficient with respect to the hole in the straddling portion 10b to prevent an upward movement of the pin 16 so as to maintain the end 15b of the spring 15 in a position depressed into the recess 5d. It should therefore be understood that the spring 15 is firmly forced against the flat portion 6 of the steering column 5 to hold the column 5 against the seats 10d on the holding bracket 10.

The retaining clip 17 has a rearward extension which is formed with a downwardly bent lug 17b. The spring 15 is formed with a longitudinally extending slot 15c and, although not shown in FIG. 6, the steering column 5 is also formed with a slot which is aligned with the slot 15c in the spring 15. The downwardly bent lug 17b on the clip member 17 is inserted through the aligned slots into the hollow interior of the steering column 5. At the upper end, the lower steering shaft 3 is provided with a kicker flange 3a which is adapted to kick the lug 17b on the clip member 17 when the steering shaft 3 is axially rearwardly moved with respect to the steering column 5. It should thus be understood that, when the automobile is crashed, such relative rearward movement of the shaft 3 is produced so that the lug 17b on the clip member 17 is kicked by the kicker flange 3a whereby the bifurcated end 17a of the clip member 17 is disengaged from the circumferential groove 16a of the pin 16. Thus, the pin 16 and the end portion 15b on the spring 15 is released from constraint so that the steering column 5 becomes freely movable axially forwardly under the inertia force which will be applied thereto by the driver upon a crash of the automobile.

The steering column 5 is provided at the upper reduced diameter portion 5a with an annular abutting member 18 which is adapted to be brought into an abutting engagement with the rear straddling portion 10a on the holding bracket 10. Thus, when the automobile is crashed and the steering column 5 is released from the frictional constraint by the spring 15, the steering column 5 is pushed forwards under the inertia force of the driver to produce an axial movement thereof until the abutting member 18 is brought into an abutting engagement with the rear straddling portion 10a of the bracket 10. Thereafter, the force applied to the steering column 5 is transmitted through the brackets 10 and 7 to the deformable members 8 to thereby cause deformations of the members 8. Such deformations of the members 8 have effects of absorbing impact energies so that possible damage of the driver can be weakened.

Figure 7:
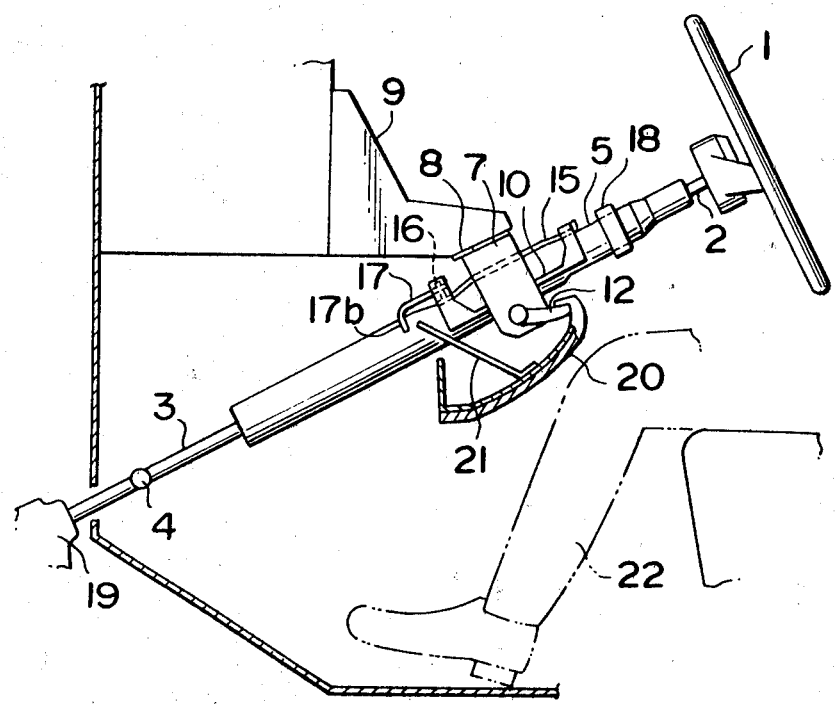
FIG. 7 is a side view showing another embodiment of the present invention.
Figure 8:
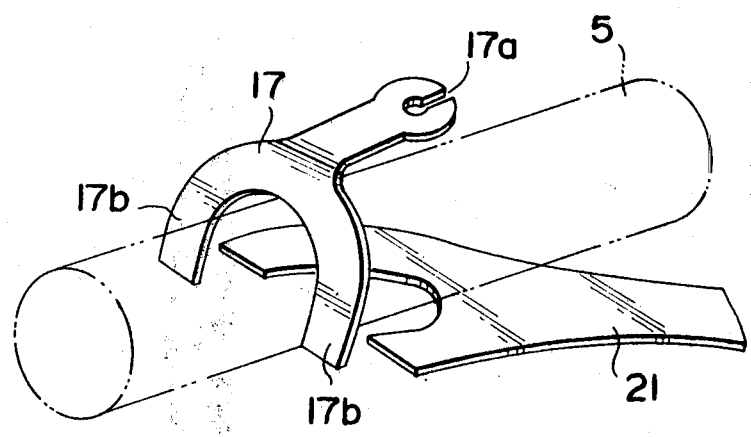
FIG. 8 is a fragmentary perspective view specifically showing the releasing mechanism adopted in the mechanism shown in FIG. 7.

Referring now to FIGS. 7 and 8, there is shown another embodiment of the present invention which includes a retaining clip member 17 of a modified form. As shown in FIG. 8, the clip member 17 includes a bifurcated end 17a for engagement with the circumferential groove 16a of the pin 16 provided on the forward end portion 15b of the spring 15. Further, the clip member 17 is formed with a forward extension having a forked end 17b which is adapted to straddle the steering column 5. Beneath the steering bracket 7, there is provided a knee pad 20 which has a forwardly extending kicker lever 21. In this arrangement, when the automobile is crashed, the knee pad 20 is pushed forwards by being engaged with the driver 22 so that the kicker lever 21 kicks the forked end 17b of the clip member 17 to have the bifurcated end 17a of the clip member 17 disengaged from the groove 16a of the pin 16. In other respects, the arrangements are the same as in the previous embodiment.

Figure 9:
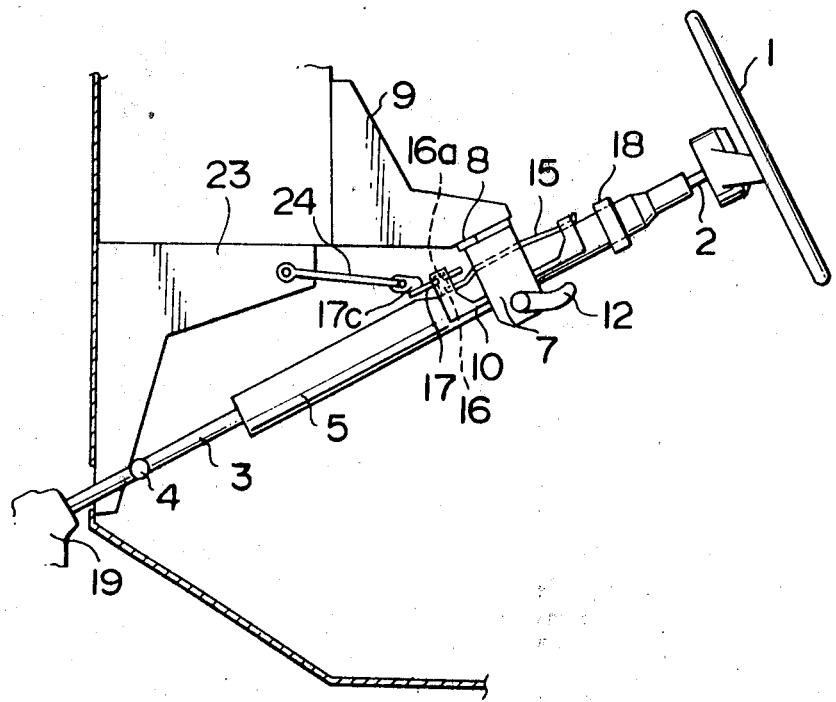
FIG. 9 is a side view of the steering mechanisms in accordance with a further embodiment of the present invention; and, FIG. 10 is a perspective view of a retaining clip member adopted in the embodiment of FIG. 9.
Figure 10:
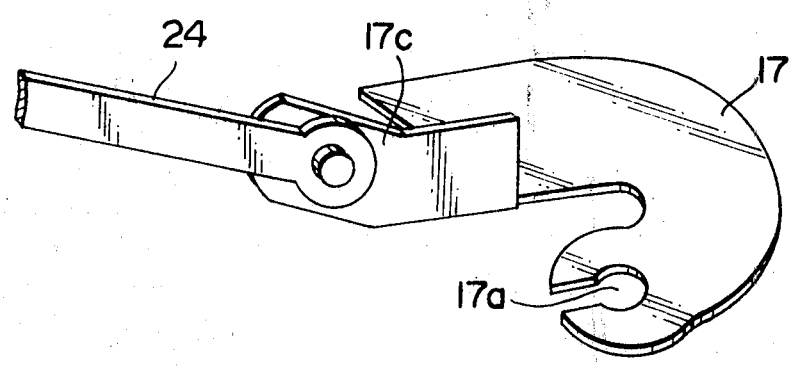

FIGS. 9 and 10 show a further embodiment of the present invention which includes a further modified clip member 17. As shown in FIG. 10, the clip member 17 is of a substantially U-shaped configuration and formed at one end with a forwardly open slit portion 17a for engagement with the circumferential groove 16a in the pin 16. At the other end, the clip member 17 is connected through a connecting member 17c and a connecting rod 24 with a brake master cylinder bracket 23. Thus, when the brake master cylinder bracket 23 is displaced rearwardly in a crash of the automobile, the clip member 17 is pushed rearwardly so that the slit portion 17a is disengaged from the groove 16a of the pin 16. In other respects, the arrangements are the same as in the previous embodiments.

The invention has thus been shown and described with reference to specific embodiments, however, it should be noted that the invention is in no way limited to the details of the illustrated structures but changes and modifications may be made without departing from the scope of the appended claims.

I claim:

1. An automobile steering mechanism comprising steering shaft means, steering column means for rotatably supporting said steering shaft means, steering bracket means provided on an automobile body for supporting said steering column means, spring means for urging said steering column means against said steering bracket so that said steering column means is frictionally held on said steering bracket means, releasable constraining means for normally holding the spring means in an operative position wherein said spring means applies its influence on said steering column means so that said steering column means is urged against the steering bracket means, means responsive to a crashing deformation of the automobile body for releasing the constraining means so that the steering column means is relieved of the influence of the spring means to thereby release the steering column means from the bracket means.

2. An automobile steering mechanism in accordance with claim 1 in which said spring means is comprised of a leaf spring extending longitudinally along the steering column means and having one end held between the steering column means and the steering bracket means, the other end of the leaf spring being provided with a pin having a circumferential groove for engagement with a bifurcated end of a retaining clip member which functions, when engaged with the circumferential groove of the pin, to force the other end of the leaf spring against the steering column means to thereby maintain a frictional engagement between the spring and the steering column means, said releasing means including a kicker means which is adapted to be moved in the crashing deformation to kick the clip member to have the bifurcated end disengaged from the circumferential groove of said pin.

3. An automobile steering mechanism in accordance with claim 2 in which said kicker means is in the form of a kicker provided on the steering shaft means at such a portion that is axially displaced upon a crash of the automobile.

4. An automobile steering mechanism in accordance with claim 2 in which said kicker means includes a kicker member provided on a knee pad which is located beneath the steering bracket means so that it is displaced forwardly by a driver upon a crash of the automobile.

5. An automobile steering mechanism in accordance with claim 2 in which said kicker means includes a kicker member which is connected with a part on the automobile body that is rearwardly displaced in a crashing deformation of the body.

6. An automobile steering mechanism in accordance with claim 5 in which said part on the automobile body is a brake master cylinder bracket.

7. An automobile steering mechanism in accordance with claim 1 in which said steering bracket means is secured to the automobile body through deformable means which can be deformed when the steering column means is axially displaced with respect to the steering bracket means.

8. An automobile steering mechanism in accordance with claim 7 in which said deformable means is in the form of a U-shaped sheet metal member having longitudinally extending upper and lower legs which are respectively secured to the body and the steering bracket means so that the steering bracket means is displaced with respect to the body causing a deformation of the U-shaped member.

* * * * *